US005596576A

United States Patent [19]
Milito

[11] Patent Number: 5,596,576
[45] Date of Patent: Jan. 21, 1997

[54] SYSTEMS AND METHODS FOR SHARING OF RESOURCES

[75] Inventor: Rodolfo A. Milito, Piscataway, N.J.

[73] Assignee: AT&T, Holmdel, N.J.

[21] Appl. No.: 552,899

[22] Filed: Nov. 3, 1995

[51] Int. Cl.$^6$ .................................. H04J 3/22; H04J 3/16
[52] U.S. Cl. .......................... 370/450; 370/455; 370/468
[58] Field of Search ............................. 370/17, 60, 60.1, 370/61, 85.6, 94.1, 85.4, 95.1, 58.1, 58.2, 85.7, 77, 79, 84

[56] References Cited

U.S. PATENT DOCUMENTS

| | | | |
|---|---|---|---|
| 5,274,644 | 12/1993 | Berger et al. | 370/95.1 |
| 5,311,513 | 5/1994 | Ahmadi | 370/85.4 |
| 5,381,407 | 1/1995 | Chao | 370/60 |

*Primary Examiner*—Wellington Chin
*Assistant Examiner*—Huy D. Vu
*Attorney, Agent, or Firm*—Stephen M. Gurey

[57] ABSTRACT

A method for allocating access to a shared limited resource among a plurality of users who require access to the resource, the allocation being made such that each user is granted access to the resource at a minimum guaranteed rate associated with each user and such that the resource is available for use by any user exceeding its minimum guaranteed rate only if the resource is available, the method comprising the steps of: assigning tokens to each user at a rate determined by the minimum guaranteed rate associated with each user; storing tokens assigned to each user in a bank associated with each user, each bank having a finite capacity associated with each user; storing tokens assigned to a user whose associated bank has reached its capacity in a bank assigned to another user whose bank is below its capacity; and allowing a user requesting access to the resource to have access to the resource if the user has a predetermined number of tokens in its associated bank and otherwise denying access to the resource.

16 Claims, 6 Drawing Sheets

SYSTEMS AND METHODS FOR SHARING OF RESOURCES

FIELD OF THE INVENTION

This invention relates to systems and methods for sharing limited resources among a number of users and/or classes of users.

BACKGROUND OF THE INVENTION

Resources are often shared by a number of users. For example, telecommunication service providers have a certain limited number of resources that are critical to serve their customers' requests. A fair and efficient system for allocating the resources is desirable to prevent heavy users from degrading the performance of the system while allowing unused resources to be fully utilized.

The issue of guaranteeing a fair share of resources in a shared resource setting pervades our current business environment. It is widely recognized that sharing can in principle lead to economies of scale, and that non-simultaneity of demand (e.g., business vs. residential traffic) can be exploited. There is no integrated framework that guarantees users real time access to their contracted "slices" of a resource even in the face of unanticipated large demands from other customers. Protection can be achieved by complete partitioning of the resources. Such partitioning is effective in that users are protected from each other but is not efficient in that resources assigned to and not used by a particular user are wasted.

In a typical resource sharing situation, as exemplified by communications and computer networks, there is a need to address three major problems; namely, the problem of controlling the access to a system or subsystem, the problem of scheduling a particular processor, and the problem of allocating discrete resources.

To help visualize the problems and solutions, we will refer to an AT&T, Inc. 5ESS® switch. FIG. 1 depicts a 5ESS® subject to the demand of multi-class traffic, represented by streams a to z. Typically, a stream bundles the requests of a particular service, which can include, for example, call setups. For instance, a stream associated with wireless service may include handover requests, location updates, etc. A given activity places demands on a number of resources such as links, processors, data bases, trunks, etc.

The 5ESS® is engineered and provisioned so that it can provide a certain grade of service subject to a certain sustained traffic mix. Basic access control mechanisms could be implemented to guarantee that no class exceeds its contractual value. Such an approach would be effective, but hardly efficient. After all, access to a class that exceeds its allocated rate should not be denied when the system is operating below capacity because other classes are below their contractual rates. Traffic variability makes this a common occurrence. It is not unlikely for a class to exceed its contractual rate, and this does not necessarily happen when all classes are demanding their full share.

The second problem, i.e., the sharing of a processor, is local in nature. It may be necessary to control the sharing of a processor in addition to the global access control. For example, a particular processor may play a critical role as a global resource. Second, different classes tax various resources differently. By its very nature, a global access mechanism has to be based on estimates of the demand of each class of every resource. Moreover, a single class may contain in itself a number of activities. Therefore, the estimate assumes a certain mix of activities, but there is no guarantee that, once a class has obtained access, it will have such a mix.

Finally, we face the problem of sharing discrete resources. An example is the contention for trunks in the 5ESS®.

U.S. Pat. No. 5,274,644 (the "'644 patent"; incorporated herein by reference) discloses several examples of methods for controlling access to a common resource, including a scheme that utilizes "tokens" to regulate access to the common resource. The '644 patent system includes a "throttle" associated with each user that regulates that user's access to the resource based on that user's access to tokens, as described below.

FIG. 2 depicts a rate control throttle for a single stream. The system can provide a desirable grade of service as long as key parameters of the traffic (arrival rate, peakedness) are kept within certain bounds. The rate control throttle guarantees that, in the long run, the admission rate in the system does not exceed a predetermined value, and shapes the traffic by limiting its peakedness. This predetermined value is used to establish a contractual admission rate "$r_i$" for each user ($i=1$ to N, N being the total number of users), and a peakedness related factor "$L_i$". The mechanism consists of a bank $B_i$ for each user, of finite capacity $L_i$, and a source (not shown) that generates tokens at a predetermined rate $r_i$. The admission mechanism works as follows:

i) Tokens are generated at rate $r_i$.

ii) A freshly generated token is deposited in bank $B_i$ if the number of tokens already in the bank is less that $L_i$. Otherwise, the token is destroyed.

iii) An arrival from user i that finds a token in bank $B_i$ is admitted into service (and the token destroyed). Otherwise, the arrival is either rejected or queued.

As shown above, the rate control throttle is an effective mechanism that can be generalized to the case of N classes of users by providing a separate bank for each class. This system is effective, but is not completely efficient. When several classes contend for a given resource, it is likely that some of them will be operating below their contractual levels. The rate at which tokens are destroyed for finding a full bank is an indication of resource underutilization (provided of course that the provisioning of resources, and the assigning of token rates is sound).

One proposal to solve the problem of underutilization, described in the '644 patent, is to add an extra bank "$B_0$", called the spare or overflow bank. As any regular bank, the overflow bank also has a limited capacity. The mechanism operates as follows (see FIG. 3):

i) Tokens corresponding to class i are generated at the contractual rate $r_i$, ii) A freshly generated class i token is deposited in bank $B_i$, if the number of tokens already in $B_i$ is less than $L_i$. Otherwise, the token is stored in the overflow bank $B_0$. If the overflow bank happens to be full, the token is destroyed.

iii) A class i arrival that finds a token in bank $B_i$ is admitted into service (and the token destroyed). If no token is available in bank $B_i$, but the overflow bank is not empty, the class i arrival is also admitted into service (and a token is destroyed in the overflow bank). Otherwise, the class i arrival is either rejected or queued.

An article authored by Berger and Whitt, entitled "A Multi-Class Input Regulation Throttle", (*Proceedings Of The 29th IEEE Conference On Decision and Control,* 1990, pp. 2106–2111), examines the case in which arrivals that are not admitted are lost from the system. This article discusses exact blocking and throughput for the case of two Poisson streams, and approximate models for N>2 classes. (This article is incorporated herein by reference.)

If arrivals that are not immediately admitted are queued and the number of classes exceeds two, access rules to the overflow bank by queued jobs need to be specified.

Yet another efficient multiclass admission control algorithm, homomorphic to the rate control throttle, is the leaky bucket mechanism, also described in the '644 patent. Instead of focusing on the availability of a certain amount of a material (e.g., a token) that flows in at a fixed rate, the leaky bucket mechanism considers the availability of space in a bucket that drains at a fixed rate.

In addition to N real buffers (queues $Q_1, Q_2 \ldots, Q_N$), the leaky bucket access mechanism consists of N+1 virtual buffers (leaky buckets $LB_0, LB_1, \ldots, LB_N$). Each class is assigned its own queue, and its own leaky bucket. While the size of the queues is infinite, the leaky buckets have finite capacity. We denote as $L_i$ the capacity of $LB_i$, i=0, ... N. The additional leaky bucket ($LB_0$) is common to all classes. To be admitted into the system, a class i arrival has to deposit $b_i$ quanta of fluid in its own $LB_i$ or in the common $LB_0$ if the former cannot contain the full quanta. Should the sum of the spare capacity in $LB_i$ and $LB_0$ be less than $b_i$ the arrival waits in $Q_i$. Fluid originated by class i traffic is continuously deposited in bucket $LB_i$, and possibly in $LB_0$, as space is made by the leaks as long as $Q_i$ is not empty. Access within a class is granted according to the FIFO (i.e., first in first out) discipline as soon as the required quanta for the head of the line arrival has been deposited. $LB_i$, i≠0 leaks at the contractual rate $r_i$. When a bucket, say $LB_j$, j≠0 empties, its discharge capability at rate $r_j$ is immediately transferred to $LB_0$. As soon as fluid is deposited in $LB_j$ the leak is returned to it. That is, $LB_0$ does not have a leak of its own.

SUMMARY OF THE INVENTION

The disadvantages of the prior art have been overcome by the present invention which features an improved resource allocation system and method.

In one aspect, the invention features a method for allocating access to a shared limited resource among a plurality of users who require access to the resource, the allocation being made such that each user is granted access to the resource at a minimum guaranteed rate associated with each user and such that the resource is available for use by any user exceeding its minimum guaranteed rate only if the resource is available, the method comprising the steps of: assigning tokens to each user at a rate determined by the minimum guaranteed rate associated with each user; storing tokens assigned to each user in a bank associated with each user, each bank having a finite capacity associated with each user; storing tokens assigned to a user whose associated bank has reached its capacity in a bank assigned to another user whose bank is below its capacity; and allowing a user requesting access to the resource to have access to the resource if the user has a predetermined number of tokens in its associated bank and otherwise denying access to the resource.

In preferred embodiments, the users are assigned different priorities and selected based on the assigned priorities.

The method further comprises the step of deleting a predetermined number of tokens from a bank associated with a user that is granted access to the resource. The predetermined number of tokens can be one token. Each bank can either have the same predetermined finite capacity, or at least two of the banks can have different capacities.

In another aspect, the invention features a method for allocating access to a shared resource, comprising the steps of: (a) establishing an incrementable counter for each of a plurality of users of the resource, the incrementable counter having a count; (b) incrementing the count in each counter established for each user at a rate associated with each user if the count is below a predefined maximum count associated with each user; (c) permitting a user requesting access to the resource to have access if the count in the counter established for the user requesting access is non-zero; and (d) incrementing the count in a counter associated with a user whose counter is below the predefined maximum count at a rate higher than its associated rate if the count in any other counter incremented in step (b) is at its predefined maximum count.

In still another aspect, the invention features a method for sharing access to a common resource among N users, where N is an integer greater than 1, comprising the steps of: assigning a rate "$R_i$" to each of the N users, the rate indicating the minimum desired access rate for the $i^{th}$ user, where $1 \leq i \leq N$; storing an indicia "$B_i$" of the eligibility of the $i^{th}$ user to access the common resource for each of the N users; incrementing each $B_i$ at its associated rate $R_i$ up to a predetermined limit $L_i$ assigned to each of the N users; incrementing a selected $B_i$ at a rate greater than its associated $R_i$ in the event that any other $B_i$ is at its associated limit $L_j$, and the selected $B_i$ is not at its limit $L_i$; and allowing the $i^{th}$ user to access the common resource if its associated $B_i$ is not zero. The method preferably further includes the step of decrementing $B_i$ upon the granting of access to the ith user of the resource.

DETAILED DESCRIPTION OF A PREFERRED EMBODIMENT

A first embodiment of the invention features a variant of the token and leaky bucket schemes discussed above, where certain classes are able to withdraw a token from the common bank $B_0$ (or are allowed to deposit their quanta of fluid in $LB_0$) first, and use their own banks (or buckets) only when the common bank (or bucket) is full. This scheme allows the system to give priority to certain classes and allow those classes to "save" their own access to the resources for future use if there are some overflow resources that can be utilized first.

In a second embodiment, the system can eliminate the overflow bank or bucket completely and, instead, redistribute the excess tokens generated by (or leak capacity of) users operating below their contacted capacity, to certain selected users. This scheme is explained next and, for ease of explanation, it is explained only in the context of the leaky bucket analogy.

Figure 4:
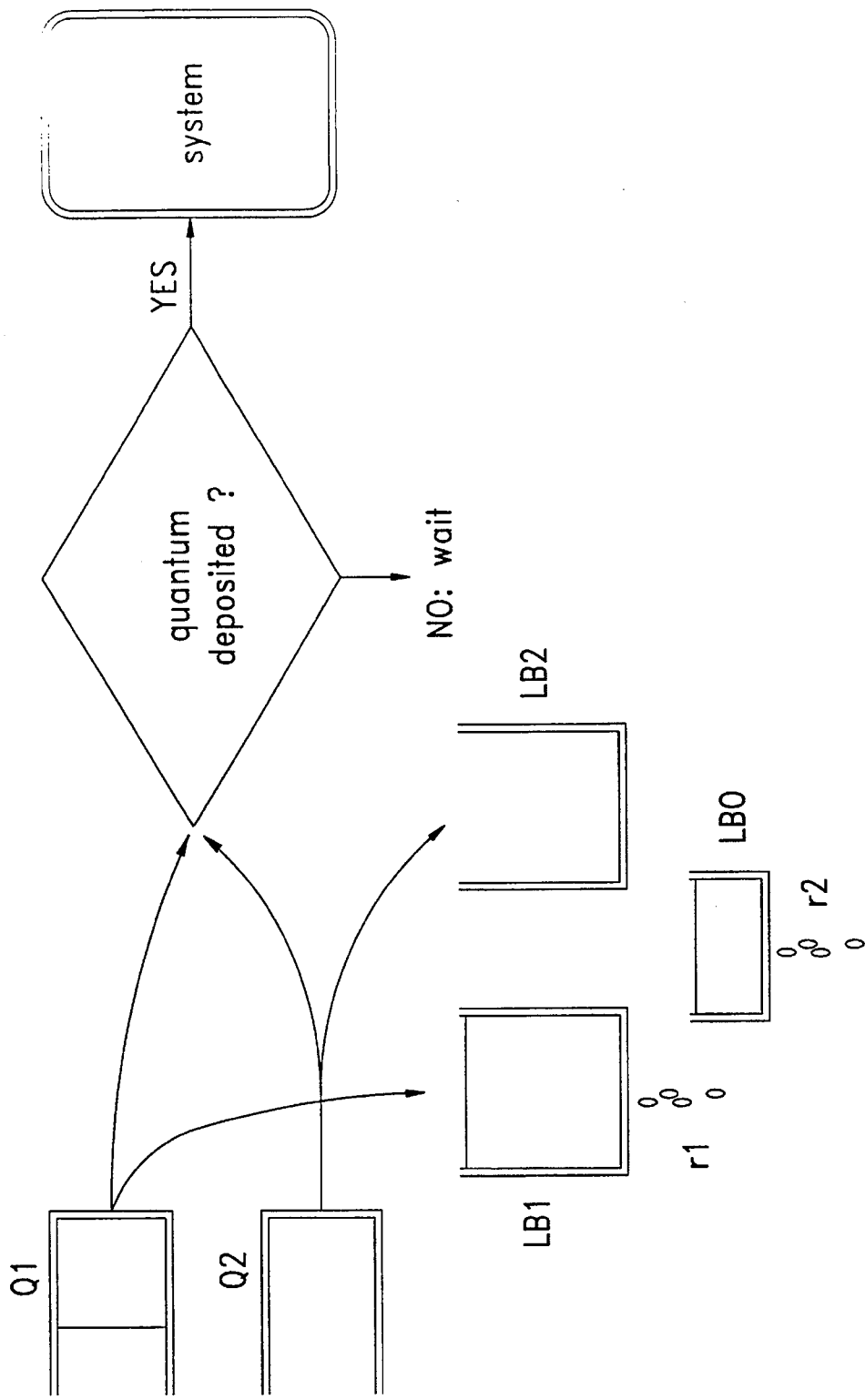
FIG. 4 is a block diagram illustrating a third prior art throttle control technique.

Consider the scheme illustrated in FIG. 4, where the size of the common bucket $LB_0$ is be made arbitrarily small, which means that the impact of the common bucket on the burstiness of the admitted stream is negligible. FIG. 4 captures a particular situation in which bucket $LB_2$ is empty. Therefore, its drainage capability is currently exercised on the common bucket $LB_0$. Also note that there are class 1 arrivals waiting in the real queue $Q_1$. As shown in FIG. 4 this implies that there is no room in buckets $LB_0$ and $LB_1$ to deposit the needed quanta to allow access to the system for the Class 1 arrival (thus, the class 1 arrival is waiting on $Q_1$).

Let the auxiliary variables $Z_n^{(i)}$, $i=1,2$ denote the sum of the workload in $LB_0$, $LB_i$, and $Q_i$ at arrival epoch n without counting the arrival. We will also denote $Q_i$, $LB_i$, and $LB_0$ as the amount of work in the queue and the leaky buckets. In the particular state shown in FIG. 4 $Z_1 = LB_0 + LB_1 + Q_1$, and $Z_n^{(2)} = LB_0$. An arrival has to wait in $Q_i$ until the deposit of $b_i$ quanta of fluid is completed, but fluid is leaked from buckets as long as $Q_i > 0$ and $LB_i + LB_0 - L_i - L_0 < 0$. Also note $LB_i > 0 \Rightarrow LB_0 = L_0$. We use the index n to denote the epoch of the $n^{th}$ arrival to the system, $\Delta_{n+1}$ for the time between epochs n and n+1, and introduce the random variables $$a_n^{(i)} = \begin{cases} 1 & \text{if the arrival at epoch } n \text{ is class } i \\ 0 & \text{otherwise} \end{cases}$$

No simultaneous arrivals are allowed i.e., $a_n^{(1)} a_n^{(2)} = 0$. To describe the evolution of the system between arrival epochs we include the workload contributed by the previous arrival, and then account for the drainage during the interval $\Delta_{n+1}$.

$$\hat{Z}_{n+1}^{(1)} = Z_n^{(1)} + a_n^{(1)} b_n^{(1)} + \min(a_n^{(2)} b_n^{(2)}, [L_0 - Z_n^{(2)}]^{+0}) \quad (1)$$

$$\hat{Z}_{n+1}^{(2)} = Z_n^{(2)} + a_n^{(2)} b_n^{(2)} + \min(a_n^{(1)} b_n^{(1)}, [L_0 - Z_n^{(1)}]^{+}) \quad (2)$$

$$Z_{n+1}^{(1)} = [\hat{Z}_{n+1}^{(1)} - \Delta_{n+1} r^{(1)} - [\Delta_{n+1} r^{(2)} - \hat{Z}_{n+1}^{(2)} + L_0]^{+}]^{+} \quad (3)$$

$$Z_{n+1}^{(2)} = [\hat{Z}_{n+1}^{(2)} - \Delta_{n+1} r^{(2)} - [\Delta_{n+1} r^{(1)} - \hat{Z}_{n+1}^{(1)} + L_0]^{+}]^{+}. \quad (4)$$

Equations 1–4 highlight the impact of having the common bucket $LB_0$. Consider the evolution of a particular bucket, say $LB_1$. The negative term in equation 3 represents the contribution to the common drainage by $LB_2$. The latter contributes to the common drainage when $\Delta_{n+1} r^{(2)}$, its drainage capability during the interval, exceeds its own exclusive workload $\hat{Z}_{n+1}^{(2)} - L_0$. This common drainage capability is the distinctive feature of having $L_0$. On the other hand, $Z_{n+1}^{(1)}$ is somewhat impacted by a class 2 arrival, as shown by the third term on the right side of equation 3. However, as this term shows, that impact cannot exceed $L_0$. Our interest is to find the cumulative distribution function (CDF) of the workload $D_n^{(i)}$ in $Q_i$, $i=1,2$ at arrival epoch n. Accordingly:

$$Pr\{D_n^{(i)} > x\} = Pr\{Z_n^{(i)} > L_0 + L_i + x\}. \quad (5)$$

Equations 1 and 2 are coupled. That is, getting the CDF of $Z_n^{(i)}$, $i=1,2$ requires finding the joint distribution of $(Z_n^{(1)}, Z_n^{(2)})$. Note that the dimension of the state space is 2, rather than 3, as would be if we reversed the order in making deposits to the common bucket and the own bucket. This represents a substantial simplification in the numerical procedure to compute the CDF of $D_n^{(i)}$, $i=1,2$.

Considerable insight into the access method can be gained by comparing it to a multiclass access without a common bucket. As noted above, such a scheme is effective in terms of protection, but lacks in efficiency. We now prove the point for the particular case of two classes. To this goal consider a separate access mechanism without a common bucket subject to the same arrivals as our original system, and use bars to differentiate its variables. In particular, equations 1 and 2 reduce to $$\bar{Z}_{n+1}^{(i)} = [\bar{Z}_n^{(i)} + a_n^{(i)} b_n^{(i)} - \Delta_{n+1} r^{(i)}]^{+}, \quad i=1,2. \quad (6)$$

and equation 5 translates into $$Pr\{\bar{D}_n^{(i)} > x\} = Pr\{\bar{Z}_n^{(i)} > \bar{L}_i + x\}. \quad (7)$$

Choose $\bar{L}_i = L_i$, $i=1,2$, $L_0 = \epsilon$, and write $Z_n^{(i)}(\epsilon)$ to emphasize the dependence of the workload on the size of the common bucket. Let $$W_n^{(i)} = \lim_{z \to 0} Z_n^{(i)}(\epsilon).$$

Set $W_0^{(i)} = \bar{Z}_0^{(i)}$, $i=1,2$. Then, for any integer $n > 0$ the random variable $W_n^{(i)}$ is n stochastically smaller than $\bar{Z}_n^{(i)}$, i.e., $Pr\{W_n^{(i)} > x\} \leq Pr\{\bar{Z}_n^{(i)} > x\}$ for all $x \geq 0$.

Note that as $L_0 \to 0$ the contribution of the other class to the workload of class i (equations 3 and 4) reduces to zero. However, even for $L_0 \neq 0$ the other class contributes to the drainage of $Z_n^{(i)}$ (equations 3 and 4). Therefore, in the limit, the evolution of $Z_n^{(i)}(\epsilon)$ matches that of $\bar{Z}_n^{(i)}$ with the addition of a non positive term.

The following corollary shows that the multi-class access controller with a common bucket outperforms the classical access controller from the point of view of access delay.

Under the conditions described above the random variable $D_n^{(i)}$ is stochastically smaller than $\bar{D}_n^{(i)}$, i.e., $Pr\{D_n^{(i)} > x\} \leq Pr\{\bar{D}_n^{(i)} > x\}$ for all $x \geq 0$.

The inequality can be rewritten $Pr\{W_n^{(i)} > L_i + x\} \leq Pr\{\bar{Z}_n^{(i)} > L_i + x\}$, which holds according to the above proposition.

As noted above, a variant to the classical leaky bucket mechanism was proposed where users probe the extra bucket $LB_0$ first, and deposit fluid in their own bucket if $Lb_0$ is full. The behavior of the proposed scheme was then compared to the standard multi-access approach. To make a consistent comparison, the size of the bucket $LB_0$ was set to zero. The process of doing that illuminated that the mechanism to redistribute extra capacity relies primarily on the redistribution of the leak capability, not on the extra bucket $LB_0$. Hence, the extra bucket is eliminated altogether, and the algorithm is modified in the following way: whenever bucket $LB_i$ is empty, its capability to drain at rate $r_i$ is distributed among the non-empty buckets. Two algorithms can be used to redistribute the leaks:

i) Redistribution of the excess capacity in proportion to the contractual rate. Say that $LB_z$ is empty. Let $A = \{LB_i : LB_i > 0\}$. Then, increment the leak rate of bucket $LB_i$, $i \in A$ by $$r_z \frac{r_i}{\sum_{j \in A} r_j}.$$

ii) Redistribution of the excess capacity according to a priority table. Have the buckets ordered in decreasing priority order. Idle leaks go first to the head of the priority list. Only when this bucket is empty, they move to the second in the list, and so on.

These two schemes are extremes of a range that goes from a particular interpretation of fairness all the way to a discriminatory arrangement. Other possibilities include allocating the excess to the most needy bucket.

There are at least two compelling advantages to this embodiment of the invention. First, while rates relate to mean arrival rate to the system, bucket sizes are associated with the burst the system can endure. It is advantageous to have a mechanism whose worst burst equals that of assigning a standard leaky bucket per class. Second, a cleaner implementation, focused on the distribution of the excess capacity, is achieved.

System malfunctions, or external traffic not controlled by the throttle may still result in occasional system overload scenarios. While the rate control throttle is an open-loop controller, it is possible to provide a slow time-scale adaptation loop by making the set of rates $\{r_i\}$ dependent on the status of the system.

The access controller without an extra bucket proposed above has a built-in upward adaptation mechanism of the rates to distribute extra capacity that contrasts with the closed-loop, slow time-scale downward adaptation under overload. Actually, it is quite possible that while the overall rate is decreased due to congestion caused by uncontrolled traffic the actual rates associated with some classes are increased due to the contribution of inactive users.

Figure 5:
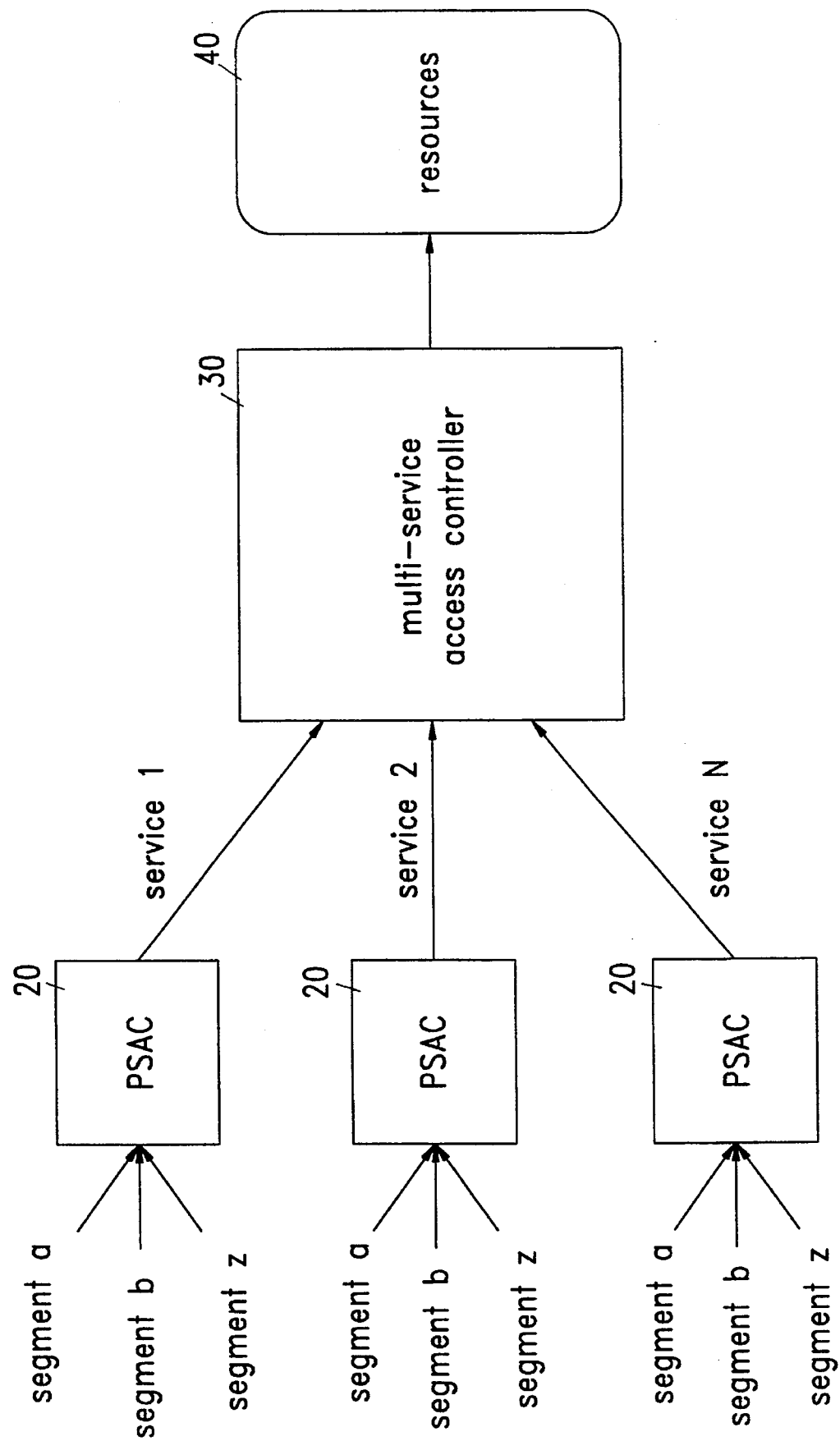
FIG. 5 is a block diagram illustrating an access control technique of the invention.

The preceding access control schemes can be used to control access to a group of resources at multiple levels. For example, it may be desirable to use one system to control access to a service (e.g. wireless) among a number of customers and then to use another scheme to control access among a number of different services to the resources. FIG. 5 illustrates such a system, wherein a number of segments a–z first compete for access to one of services 1–N under the control of priority segments access controllers ("PSAC") 20. Thereafter, the services compete for access to the resources 40 under the control of a multi-service access controller ("MSAC") 30. MSAC 30 preferably uses one of the access control schemes discussed above (described, for convenience, using the "token" analogy, although the leaky bucket analogy could also be used).

Figure 6:
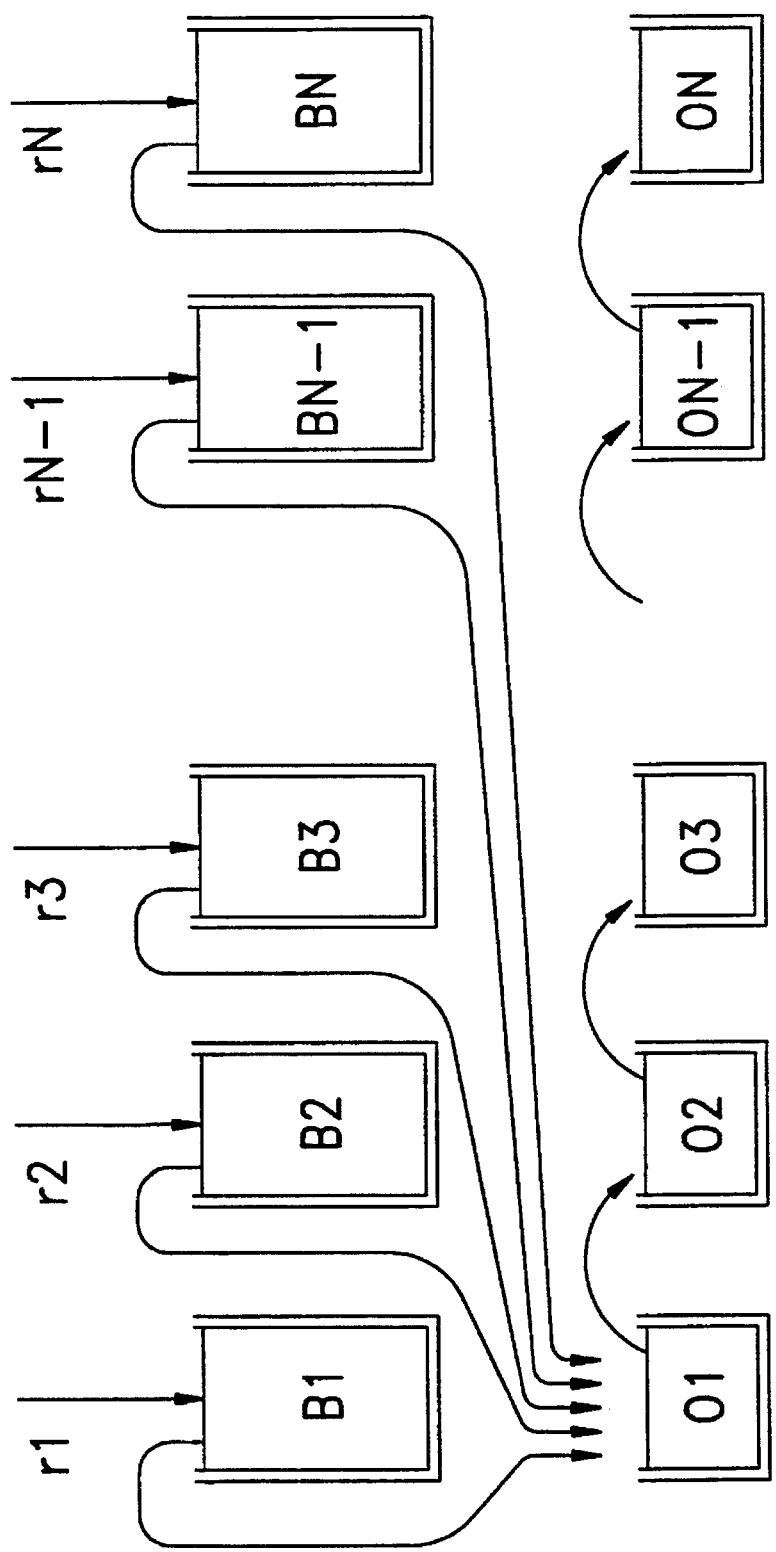
FIG. 6 is a block diagram illustrating a system according to the invention for controlling both access to a service among a number of segments and access to a resource among a number of services.

Each PSAC 20 controls access to its corresponding service according to the following preferred method. Referring to FIG. 6, a number of banks $B_1$–$B_N$ are shown, each corresponding to one of N classes of users of a system (each class corresponding to a user segment a–z). Each class's bank $B_i$ receives a stream of tokens at a contractual rate of $r_i$. Also associated with each class is an overflow bank $O_i$. If a token generated for a particular class finds a full bank $B_i$, the token is not immediately deposited in that class's overflow bank $O_i$. Instead, the system first attempts to deposit the extra token in bank $O_1$, representing the overflow bank of class 1, a higher priority class in this system. If overflow bank $O_1$ is full then the token is deposited in overflow bank $O_2$, and so on.

Thus, while each class is guaranteed its contractual rate, excess capacity is distributed on a priority scheme that favors certain classes.

Modifications to this scheme can be made as appropriate for the desired priority scheme to be implemented. For example, a single high priority class can be designated with each class first attempting to deposit overflow tokens to this class's overflow bank and if this overflow bank is full, then depositing excess tokens in their own overflow bank. The sizes of the overflow banks can also be modified to reflect the preferred priorities of the system.

A multi-class polling algorithm for processor sharing will now be described. Consider a processor to be shared by N users. Say that fraction $f^{(O)}$ of the processor real time is allocated to overhead (typically, $f^{(O)} \approx 0.1$ to 0.15). Overhead will be considered user 0, for a total of N+1 users.

Let $f^{(i)}$ denote the fraction of real time usage contracted by user i. Assume that $$\sum_{i=0}^{N} f^{(i)} = 1.$$

Normalization takes care of the case in which the sum of the contracted fractions plus the needed overhead $f^{(O)}$ is less than one. Job requests of user i are stored in buffer $B_i$. Buffer $B_0$ is reserved for overhead work. Time is divided into slots of duration $\tau$. The granularity is processor dependent, and the trade-offs are easy to identify: too course of a granularity gives poor control, too fine a granularity may result in unacceptable overhead.

Every $\tau$ seconds the processor has to pick up $\tau$ seconds worth of work from one of the set of buffers $B=\{B_i, 0 \leq i \leq N\}$. The processor is scheduled in a way that: a) guarantees that every user that operates within its contractual limits receives the service it expects; b) guarantees that every user that operates above its contractual limits receives at least its contractual share; and c) the processor does not refuse service in any visit if there is work in any buffer. Note that the service discipline is not truly work conserving in that the processor may serve a buffer with less than $\tau$ seconds worth of work. Also note that as $\tau \to 0$ the discipline approaches a work conserving one.

At epoch $\underline{n}$, the control variable $u_n^{(i)}$ denotes the decision in relation to buffer $B_i$:

$$u_n^{(i)} = \begin{cases} 1 & \text{if } B_i \text{ is chosen} \\ 0 & \text{otherwise.} \end{cases} \quad (8)$$

Consider a scenario in which no buffer (including $B_0$) ever empties. Note that $$\sum_{j=i}^{n} u_j^{(i)}$$

denotes the number of times the processor has chosen a segment from the buffer $B_i$, up to, and including, epoch $\underline{n}$. To meet the contractual fractions $\{f^{(i)}\}$ we demand that $$\lim_{n \to \infty} \frac{\sum_{j=1}^{n} u_j^{(i)}}{n} \geq f^{(i)}, i = 0, 1, \ldots N. \quad (9)$$

This long run average measure is a necessary but hardly a sufficient condition to meet users' expectations. We seek then to minimize the maximum deviation of the real time allocation to user i from the target as measured by $$e_n^{(i)} = \sum_{j=1}^{n} [f^{(i)} - u_j^{(u)}], \quad (10)$$

which can be updated recursively as $$e_0^{(i)} = 0 \quad (11)$$

$$e_{n+1}^{(i)} = e_n^{(i)} + [f^{(i)} - u_{n+1}^{(i)}], n=0, 1, \ldots \quad (12)$$

Let $b_n^*$ denote the buffer served at epoch n, and consider the following algorithm:
i) Initialization:

$$e_0^{(i)} = 0 \; i=0, 1, \ldots N, \quad (13)$$

ii) Polling instant.
a. Polling decision:

$$b_n = \underset{i}{\text{argmax}}\ e_{n-1}^{(i)} \quad (14)$$

(break ties with lexicographic ordering)

$$u_n^{(i)} = \begin{cases} 1 & \text{if } b_n = i \\ 0 & \text{otherwise.} \end{cases}$$

b. State update:

$$e_n^{(i)} = e_{n-1}^{(i)} + [f^{(i)} - u_n^{(i)}]. \quad (15)$$

Accordingly, in the preferred embodiment, the polling decision at epoch $\underline{n}$ is made by selecting the largest $e^{(i)}$ at epoch $\underline{n-+b\ 1}$. Thus, access to the processor is granted to the user that exhibits the largest difference between its contracted share and its actual use over time. This is the most equitable method for processor sharing when all users are continuously seeking access to the processor (i.e., when user buffers never empty).

In most realistic scenarios, however, the server utilization is below 1, and buffers do empty. Also, jobs are normally sliced in segments. The length of a segment indicates the time it takes the CPU to perform the task, and it is therefore unrealistic to assume that all segments have the same duration. We now consider an alternative embodiment which takes these realistic problems into account.

Denote $S_n^{(i)}$ the segment length at the head of buffer Bi at polling epoch $\underline{n}$, and assume that there is a certain upper bound $S_{max}$ for the length of the segments. It is illustrative to focus on two particular cases, namely, the heterogeneous overloaded, and the homogeneous not overloaded scenarios. The overloaded, heterogeneous case can easily be handled by the following simple modification of equation 15:

$$e_n^{(i)} = e_{n-1}^{(i)} + S_n^{(bn)}[f^{(i)} - u_n^{(i)}].$$

That is, the modification is to weigh both the credit $f^{(i)}$ and the unit debit $u_n^{(i)}$ by the amount of time spent by the processor serving the segment at the head of the polled buffer.

Considering the homogeneous, non-overloaded case, it is assumed that each class $\underline{i}$ is assigned the same fraction $$f^{(i)} = \frac{1}{N+1}\ ,\underline{i} = 0,1,\ldots N$$

of the CPU, and the segment length distribution is the same for all classes. In this scenario, a natural, fair, and indeed optimal policy according to most reasonable criteria, is the round robin algorithm, in which the server skips empty buffers.

The system proceeds when the polling buffer is empty as follows. It would be wasteful for the processor to wait for a segment to arrive, so we determine that empty buffers be skipped. The question is then how to account for the "virtual" visit to the empty buffer. One could consider not charging the empty buffer for the virtual visit, and continue giving it credit for the elapsed time. The problem with this approach is that credits accumulated by an inactive source could allow it to hog the CPU when it wakes up. A reasonable solution would be to introduce exponential smoothing in the recursion, so that more weight is put on the present than in the past. Another alternative is to distribute credit at each stage only among the active buffers. A different approach is based on the concept that the selected buffer is charged a "lost opportunity" fee for the virtual circuit.

The general process can now be stated. Recall that $S_n^{(i)}$ is the segment length at the head of the buffer $\underline{B_i}$ at polling epoch $\underline{n}$. Should buffer $\underline{B_i}$ be empty, set it to $\overline{S}_i$, where $\overline{S}_i$ is, e.g., the mean segment length of user $\underline{i}$, and call it a virtual segment.

i. Initialization:

$$e_o^{(i)} = 0\ i = 0,1,\ldots N,$$

$$n = 0.$$

ii. Polling instant.
a. Polling decision:

$$b_n = \underset{i}{\text{argmax}}\ e_{n-1}^{(i)}$$

(break ties with lexicographic ordering)

$$u_n^{(i)} = \begin{cases} 1 & \text{if } b_n = i \\ 0 & \text{otherwise.} \end{cases}$$

(i can be a virtual segment, on which the processor spends no time)

b. State update:

$$e_n^{(i)} = e_{n-1}^{(i)} + S_n^{(bn)}[f^{(i)} - u_n^{(i)}].$$

As noted above, even though access to the resources is regulated, it may nevertheless be desirable to regulate access to one or more particular discrete resources. A Multi-class recirculating token scheme to access discrete resources in next described.

Trunks, 3-port conference circuits and UTDs (universal tone decoders) are among the discrete resources that may need to be shared between different classes of users. By its very nature, these resources are either busy or idle. Normally, the holding time of the resource far exceeds the time needed to communicate its status. And of course, the discrete nature of the resource maps naturally into the positive integers. The following is a recirculating token scheme with a common pool.

Say that there are $\underline{M}$ units of the resource for which $\underline{N}$ users compete.

Provisioning:
i. Assign $\underline{n_i}$ tokens to class $\underline{i}$ bank, i=1,2, . . . $\underline{N}$.
ii. Assign $\underline{n_0}$ tokens to the common bank $\underline{b_0}$, such that $$n_0 + \sum_{i=1}^{N} n_i = M.$$

Each token gives access to one unit of the resource. Tokens are recirculated, not destroyed. That is, tokens are returned to the bank(s) (own bank, or common bank) they were taken from once the unit to which they granted access becomes free.

For example, assume that class $\underline{i}$ needs $\underline{m} \geq 1$ units of the resource. There are three possibilities: i) it has $\underline{m}$ idle tokens of its own, in which case it gets access to the desired units in exchange for the tokens, ii) it has less than $\underline{m}$ tokens of its own, but the tokens in the common bank suffice to complete the demand, and class $\underline{i}$ proceeds as in (i), and iii) the sum of its own available tokens and the available tokens in the common bank is less than $\underline{m}$, in which case the demand is either rejected or queued, depending on the specific design of the system.

This scheme covers a wide range of solutions, from complete partition to total sharing of the resources. It reduces to complete resource partitioning when no tokens are assigned to the common bank ($\underline{n}_0=0$). On the other extreme, if $\underline{n}_0=\underline{N}$ and consequently $\underline{n}_i=0$, $\overline{i}=0$), we have complete resource sharing. Complete partitioning is effective: class $\underline{i}$ is always guaranteed the simultaneous access to $\underline{n}_i$ units of the resource. It is not efficient, in that it can never get access to more than $\underline{n}_i$, even if all the remaining $\underline{N}-\underline{n}_i$ units are idle. Complete sharing, on the other hand, handles this last scenario beautifully, but does not guarantee class i to $n_i$ units at every epoch. The intermediate situation $0<n_0<N$ represents a trade-off between guarantee and flexibility. To contribute to the common pool, class i will be allocated $\overline{n}_i<n_i$. The maximum number of units it can simultaneously use will vary between $\overline{n}_i$ and $\overline{n}_i+n_0$, depending on the aggregate load on the system.

One variant of the scheme consists of giving a subset of users (high priority classes) access to the common bank before searching for tokens in their own banks. To get an exact correspondence a modification of the rule to return tokens is needed. According to this modification, tokens are always returned to the high priority bank, which overflows into the common bank. These variants indicate that in general a token recirculation policy is determined by:

a. Assignment of tokens, and token banks to the different classes.

b. Assignment of tokens to one or more shared banks.

c. A rule that grants access to the banks.

d. A rule that determines to which banks the used tokens should be returned.

Figure 1:
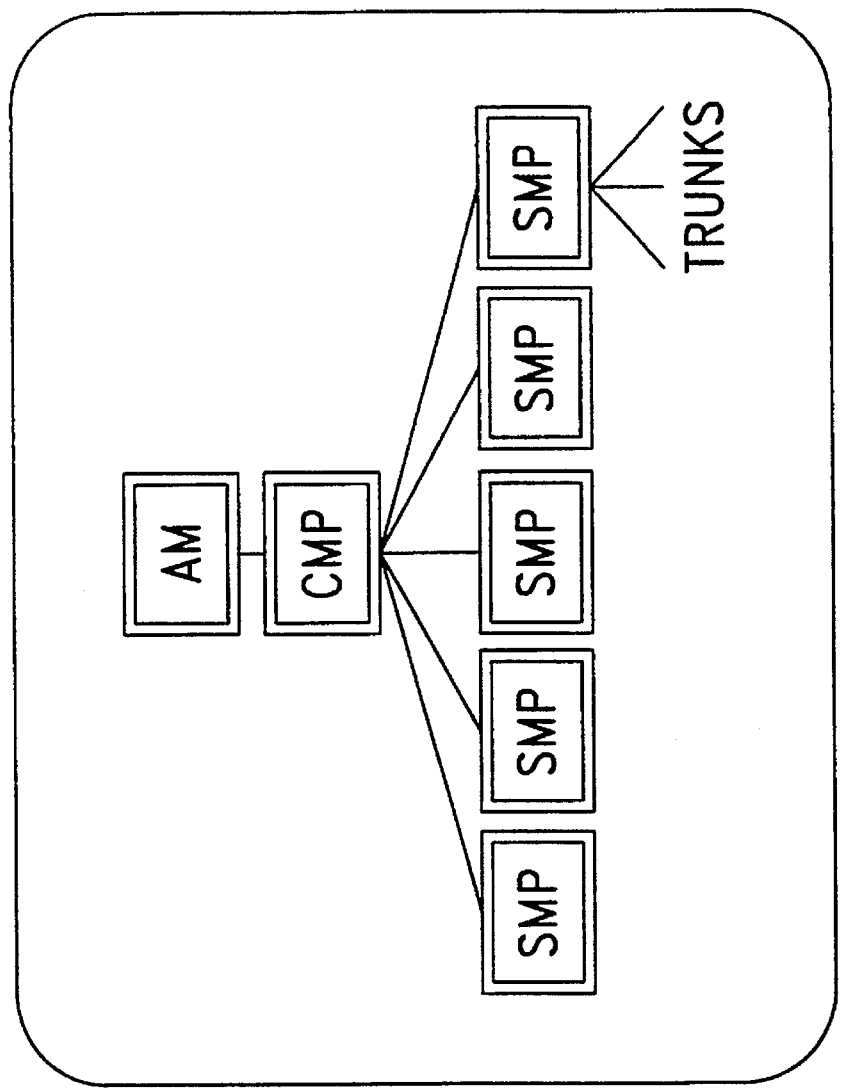
FIG. 1 is a block diagram of an AT&T 5ESS® switch with multiple classes seeking access.
Figure 1:
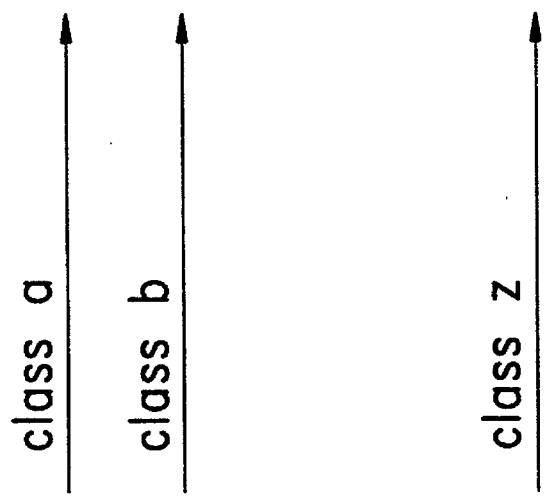
Figure 2:
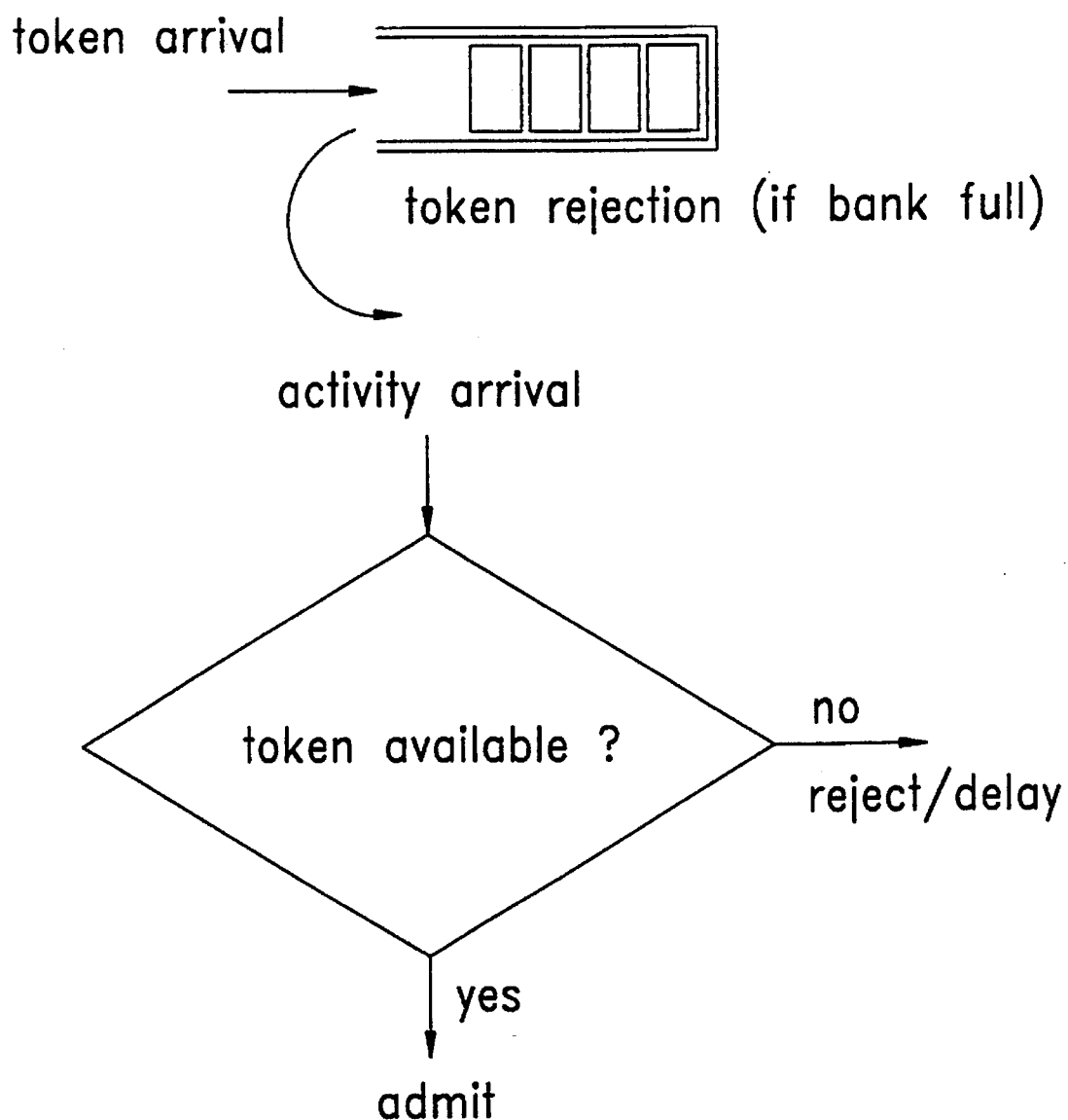
FIG. 2 is a diagram illustrating a prior art throttle control technique.
Figure 3:
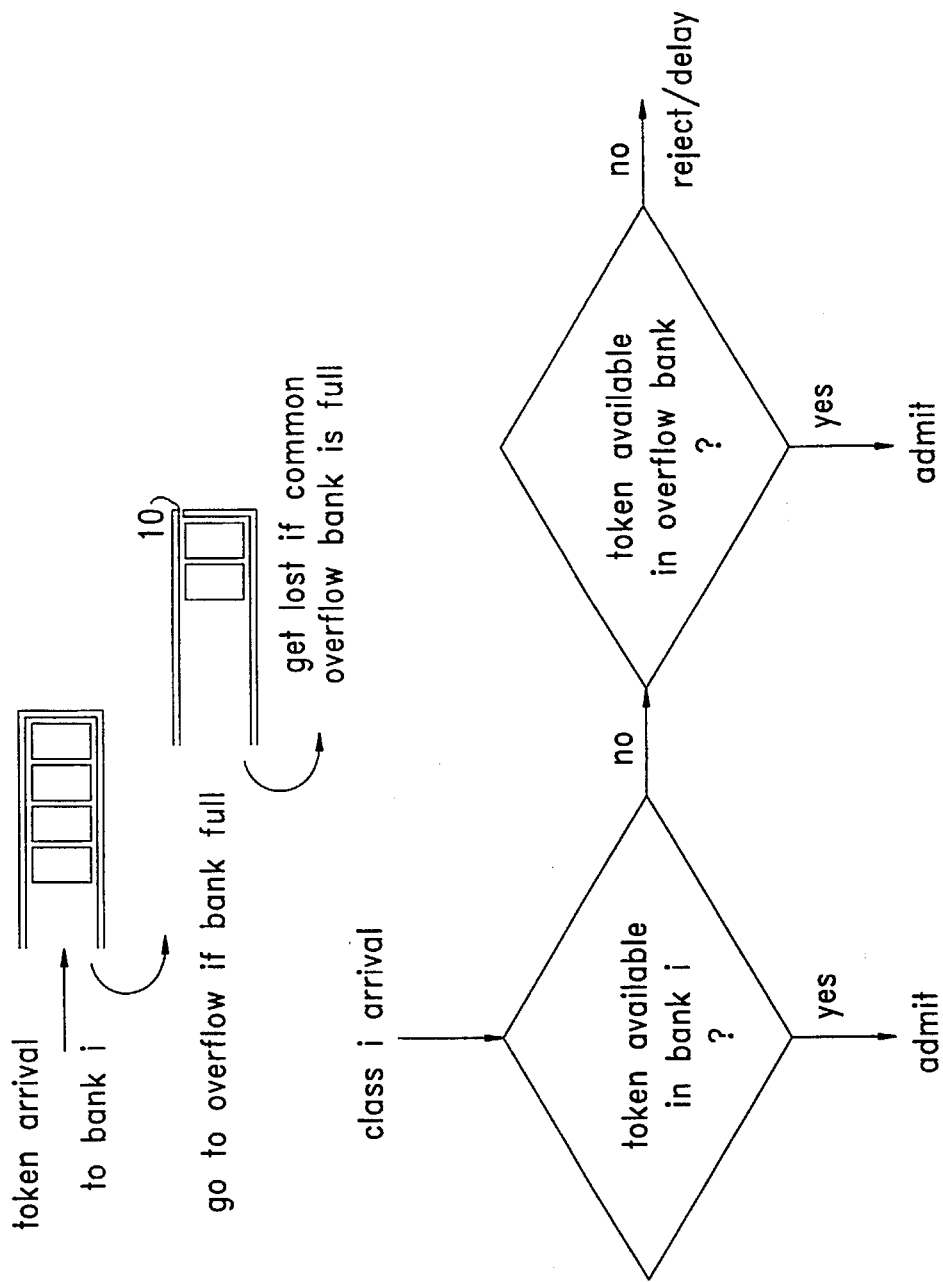
FIG. 3 is a block diagram illustrating a second prior art throttle control technique.

There are some similarities between multi-class rate access control and the recirculating token scheme. Both approaches are explained in terms of the concept of tokens, and that of a common as well as class-specific devices (banks or pools). But there are also important differences that illuminate the distinctions between the problems they address. The closed loop nature of recirculating tokens contrasts with the open loop nature of the multi-class access control. Also, wile tokens in the former are inherently discrete, the latter admits real-valued tokens. The attributes of the token recirculating scheme stem from the crispy nature of discrete resources: a unit is either in use or idle, and this status is in most cases available in real time. On the other hand, an arrival admitted into a global system such as the one depicted in FIG. 1 is bound to consume a number of different resources in more subtle ways: it will increase the utilization of a certain processor, augment the delay in certain queues, etc. Also, its impact on these internal resources (processors, links, etc.) will take place at different points in time during the holding time of the activity associated with the arrival.

The preceding description includes illustrations of the preferred embodiments that are intended only as examples, and various other embodiments are within the scope of the appended claims.

I claim:

1. A method for allocating access to a shared limited resource among a plurality of users who require access to said resource, said allocation being made such that each user is granted access to said resource at a minimum guaranteed rate associated with each user and such that said resource is available for use by any user exceeding its minimum guaranteed rate only if said resource is available, said method comprising the steps of:

assigning tokens to each user at a rate determined by the minimum guaranteed rate associated with each user;

storing tokens assigned to each user in a bank associated with each user, each said bank having a finite capacity associated with each user;

storing tokens assigned to a user whose associated bank has reached its capacity in a bank assigned to another user whose bank is below its capacity; and allowing a user requesting access to said resource to have access to said resource if said user has a predetermined number of tokens in its associated bank and otherwise denying access to said resource.

2. The method of claim 1 wherein said users are assigned different priorities and wherein said another user is selected based on said assigned priorities.

3. The method of claim 1 further comprising the step of deleting a predetermined number of tokens from a bank associated with a user that is granted access to said resource.

4. The method of claim 1 wherein said predetermined number of tokens is one token.

5. The method of claim 1 wherein each said bank has the same predetermined finite capacity.

6. The method of claim 1 wherein at least two of said banks have a different predetermined finite capacity.

7. A method for allocating access to a shared resource, comprising the steps of:

(a) establishing an incrementable counter for each of a plurality of users of said resource, said incrementable counter having a count;

(b) incrementing the count in each counter established for each user at a rate associated with each user if said count is below a predefined maximum count associated with each user;

(c) permitting a user requesting access to said resource to have access if the count in the counter established for said user requesting access is non-zero;

(d) incrementing the count in a counter associated with a user whose counter is below said predefined maximum count at a rate higher than its associated rate if the count in any other counter incremented in step (b) is at its predefined maximum count.

8. The method of claim 7 wherein said users are assigned different priorities and wherein said user selected in step (d) is selected based on said assigned priorities.

9. The method of claim 7 further comprising the step of decrementing the count in the counter established for a user requesting access if said user requesting access is granted access to said resource.

10. The method of claim 7 wherein each said user has the same associated predefined maximum count.

11. The method of claim 7 wherein at least two of said users have a different predefined maximum count.

12. A method for sharing access to a common resource among N users, where N is an integer greater than 1, comprising the steps of:

assigning a rate "$R_i$" to each of said N users, said rate indicating the minimum desired access rate for the $i^{th}$ user, where $1 \leq i \leq N$;

storing an indicia "$B_i$" of the eligibility of the $i^{th}$ user to access said common resource for each of said N users;

incrementing each $B_i$ at its associated rate $R_i$ up to a predetermined limit $L_i$ assigned to each of said N users;

incrementing a selected $B_i$ at a rate greater than its associated $R_i$ in the event that any other $B_i$ is at its associated limit $L_i$, and said selected $B_i$ is not at its limit $L_i$; and allowing the $i^{th}$ user to access said common resource if its associated $B_i$ is not zero.

13. The method of claim 12 further comprising the step of decrementing $B_i$ upon the granting of access to the ith user of said resource.

14. The method of claim 12 wherein said users are assigned different priorities and wherein said selected $B_i$ is selected based on said assigned priorities.

15. The method of claim 12 wherein each said user's associated limit $L_i$ has the same value.

16. The method of claim 12 wherein at least two of said user's associated limits $L_i$ have different values.

* * * * *